United States Patent
Schlansker et al.

(10) Patent No.: US 8,086,706 B2
(45) Date of Patent: *Dec. 27, 2011

(54) SYSTEM AND METHOD FOR SELF CONFIGURATION OF RECONFIGURABLE SYSTEMS

(75) Inventors: Michael S. Schlansker, Los Altos, CA (US); Boon Seong Ang, Sunnyvale, CA (US); Philip J. Kuekes, Menlo Park, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/053,794

(22) Filed: Mar. 22, 2011

(65) Prior Publication Data

US 2011/0173306 A1     Jul. 14, 2011

Related U.S. Application Data

(62) Division of application No. 11/540,480, filed on Sep. 28, 2006, now Pat. No. 7,975,068, which is a division of application No. 10/215,300, filed on Aug. 8, 2002, now abandoned.

(51) Int. Cl.
*G06F 15/177* (2006.01)
(52) U.S. Cl. .................. 709/221; 709/223; 709/238
(58) Field of Classification Search .............. 709/221, 709/223, 238
See application file for complete search history.

(56) References Cited

U.S. PATENT DOCUMENTS

| | | | | |
|---|---|---|---|---|
| 5,363,484 A * | 11/1994 | Desnoyers et al. | ........... | 709/212 |
| 5,392,402 A * | 2/1995 | Robrock, II | ........... | 709/227 |
| 5,999,712 A * | 12/1999 | Moiin et al. | ........... | 709/220 |
| 6,054,871 A | 4/2000 | New | | |
| 6,067,545 A * | 5/2000 | Wolff | ........... | 1/1 |
| 6,092,174 A | 7/2000 | Roussakov | | |
| 6,138,161 A * | 10/2000 | Reynolds et al. | ........... | 709/227 |
| 6,163,855 A * | 12/2000 | Shrivastava et al. | ........... | 714/4.4 |
| 6,185,635 B1 * | 2/2001 | O'Loughlin et al. | ........... | 710/31 |
| 6,255,849 B1 | 7/2001 | Mohan | | |
| 6,349,098 B1 * | 2/2002 | Parruck et al. | ........... | 370/395.6 |
| 6,636,484 B1 * | 10/2003 | Agrawal et al. | ........... | 370/248 |
| 6,636,499 B1 * | 10/2003 | Dowling | ........... | 370/338 |
| 6,654,796 B1 * | 11/2003 | Slater et al. | ........... | 709/220 |
| 6,741,552 B1 * | 5/2004 | McCrosky et al. | ........... | 370/218 |
| 6,956,858 B2 * | 10/2005 | Hariguchi et al. | ........... | 370/395.31 |
| 7,000,091 B2 | 2/2006 | Schlansker | | |
| 7,028,107 B2 * | 4/2006 | Vorbach et al. | ........... | 710/10 |
| 7,042,842 B2 * | 5/2006 | Paul et al. | ........... | 370/229 |
| 7,065,599 B2 * | 6/2006 | King et al. | ........... | 710/301 |

(Continued)

OTHER PUBLICATIONS

Wolf, A. et al., "A Variable Instruction Stream Extension to the VLIW Architecture," ASPLOS IV, (1991), p. 2-14.

(Continued)

*Primary Examiner* — Michael Won
(74) *Attorney, Agent, or Firm* — Myers Bigel Sibley & Sajovec, P.A.

(57) ABSTRACT

The invention is a system and method for reconfigurable computers. The invention involves a plurality of reconfigurable component clusters (RCCs), each of which can change their respective configuration upon receiving a configuration command. The invention uses a reconfiguration network for distributing the configuration command to the RCCs, wherein the reconfiguration network comprises a plurality of cells, wherein each RCC is connected to a cell.

38 Claims, 3 Drawing Sheets

U.S. PATENT DOCUMENTS

| | | | |
|---|---|---|---|
| 7,069,328 B1 * | 6/2006 | Bell | 709/227 |
| 7,103,761 B2 * | 9/2006 | Larson et al. | 713/1 |
| 7,164,683 B1 * | 1/2007 | Wright et al. | 370/397 |
| 7,194,609 B2 | 3/2007 | Schlansker | |
| 7,249,189 B2 * | 7/2007 | Refai et al. | 709/230 |
| 7,284,042 B2 * | 10/2007 | Beadles et al. | 709/220 |
| 7,437,477 B2 * | 10/2008 | Kuik et al. | 709/238 |
| 7,650,397 B2 * | 1/2010 | Price et al. | 709/221 |
| 7,673,023 B1 * | 3/2010 | Nelson et al. | 709/221 |
| 7,975,068 B2 * | 7/2011 | Schlansker et al. | 709/238 |
| 2002/0075870 A1 * | 6/2002 | de Azevedo et al. | 370/390 |
| 2002/0188705 A1 | 12/2002 | Bartussek et al. | |

OTHER PUBLICATIONS

Newburn, C.J., et al, "Balancing Fina and Medium Grained Parallelism in Scheduling Loops for the XIMD Architecture," Architecture and Compilation Techniques for Fine and Medium Grain Parallelism (A-23), (1993), p. 39-52.

"What is Compiler-Oriented Architacture?," [online] [Retrieved on Feb. 26, 2002] Retrieved from: www.ece.purdue.edu/hankd/CARPVIEW/Index.html, p. 1-5.

Mirsky, Ethan, et al., "Matrix: A Reconfigurable Computing Architecture with Configurable Instruction Distribution and Deployable Resources," [online] [Retrieved on: Feb. 26, 2002] Retrieved from: www.cs.caltech.edu/research/ic/transit/tn127/tn127.html, p. 1-14.

"1.62 Multiple Instruction Multiple Data (MIMD)," [online] [Retrieved on: Feb. 26, 2002] Retrieved from www.epcc.ed.ac.uk/epcc-tec/documents/intro-course/intro.book_11.html, p. 1-3.

"VLIW at IBM Research," [online] [Retrieved on: Feb. 26, 2002] Retrieved from: www.research.ibm.com/vliw/, p.1-2.

\* cited by examiner

SYSTEM AND METHOD FOR SELF CONFIGURATION OF RECONFIGURABLE SYSTEMS

CLAIM OF PRIORITY

The present application is a divisional of and claims priority from U.S. patent application Ser. No. 11/540,480, filed Sep. 28, 2006 now U.S. Pat. No. 7,975,068, which was a Divisional of U.S. patent application Ser. No. 10/215,300, filed Aug. 8, 2002 (now abandoned) the disclosures of which are hereby incorporated by reference herein in their entireties.

FIELD OF THE INVENTION

This invention relates in general to computers, and in specific to a system and method that provides a self-reconfigurable processor.

BACKGROUND OF THE INVENTION

A reconfigurable system comprises hardware devices, such as field programmable gate array device (FPGA), that can be electrically programmed to perform various specific logic functions. Existing reconfigurable systems treat the reconfiguration process as one that is externally controlled from outside the reconfigurable system. For example, a processor, that is external to a reconfigurable system may be responsible for all reconfiguration.

As reconfigurable systems provide more programmable logic and on-board memory, it becomes increasingly important to consider self-reconfiguring systems. Such systems are able to stream configuration bits from a memory within the system to reconfigurable logic within the system, so that the system reconfigures itself without external assistance. Such systems are able to "load" a static configuration under its own control, much as conventional computer systems would load a program. A memory within such a system should be able to hold either data or reconfiguration commands according to application needs, much as a conventional computer system memory holds either data or programs.

As reconfigurable processors become more complex, it becomes increasingly important to re-load configurations within one subset of the chip without disrupting computation, or the loading of a configuration, within another subset of the chip. Much as a multiprocessor system supports the concurrent loading of independent programs on distinct processors, reconfigurable systems should support the concurrent loading of independent static configurations within disjoint subsets of a common reconfigurable chip.

Existing reconfigurable systems offer limited capabilities for configuring a subset of reconfigurable chip. In particular, such configuration can only be initiated over a predefined scope. For example, the entire chip, physical portions of the chip, or physical pages of the chip may be reconfigured. Such configuration is accomplished by broadcasting or shifting configuration bits onto the entire chip or a physical page within a chip. The unit of reconfiguration for a chip is determined when the chip is designed and cannot be changed by a user.

BRIEF SUMMARY OF THE INVENTION

The invention is a system and method for reconfigurable computers. The invention involves a plurality of reconfigurable component clusters (RCCs), each of which can change their respective configuration upon receiving a configuration command. The invention uses a reconfiguration network for distributing the configuration command to the RCCs, wherein the reconfiguration network comprises a plurality of cells, wherein each RCC is connected to a cell. A cell selects the configuration command from a particular input of at least two inputs to the cell, for processing by the cell and distribution to the reconfiguration network.

The invention is a system and method for reconfigurable computers. The invention involves a plurality of reconfigurable component clusters (RCCs), each of which can change their respective configuration upon receiving a configuration command. The invention uses a reconfiguration network for distributing the configuration command to the RCCs, wherein the reconfiguration network comprises a plurality of cells, wherein each RCC is connected to a cell. A cell receives a configuration command from an input to the cell for processing by the cell. The cell selects at least one destination of at least two destinations in the reconfiguration network to receive the configuration command.

DETAILED DESCRIPTION OF THE INVENTION

Figure 1:
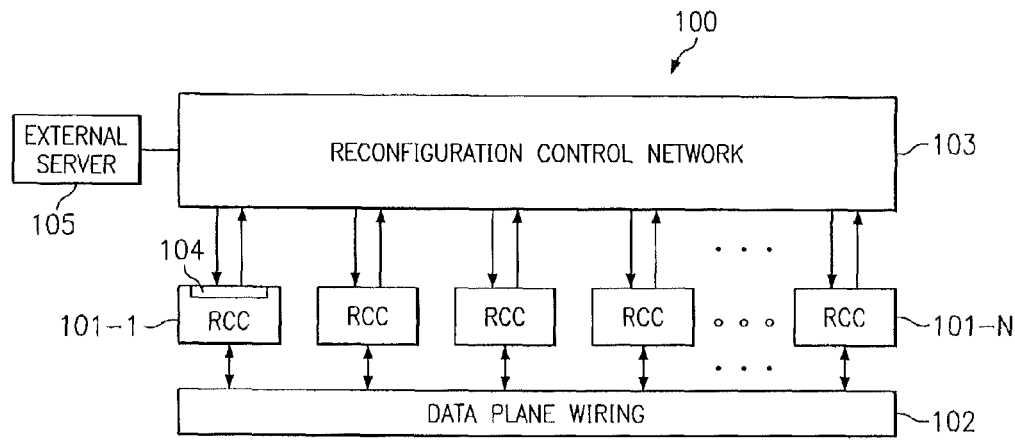
FIG. 1 depicts an example of a self-reconfiguring system, according to an embodiment of the invention.

A reconfigurable system preferably comprises devices that can be configured to perform various logic functions. This invention enables a reconfigurable system to perform self-reconfiguration on a logically defined subset of the system without interfering with the other parts of the system. In a self-reconfiguring system, the reconfiguration process is controlled by a part of the system itself. For example, the self-reconfiguration function is implemented by logic configured from the underlying reconfigurable devices. Performing reconfiguration on a subset of the system without interfering with the other parts of the system allows the other parts to operate independently, either executing the logic functions that have been configured in those parts, or undergoing their own separate reconfigurations. Logically defined reconfiguration scope provides flexibility in that the system can be partitioned into parts that are sized according to application needs. The self-reconfiguring and non-interfering features complement this flexibility, enabling each part to have its own reconfiguration controller and operate independently. One feature of this invention is a priority mechanism that enables forced reconfiguration of a subset of the chip, e.g. reconfiguration can be made to happen without the cooperation of that subset of the chip. This feature is advantageous in systems having a general purpose computing environment, where system code has the power to regain control over resources previously allocated to a user-level program.

The invention preferably utilizes a reconfiguration control network to disseminate configuration information. A reconfiguration controller within the system may issue reconfiguration commands that are transported by the reconfiguration control network to their intended destination reconfigurable devices. Upon incorporating these commands, the devices may take on new logic functions. The system preferably has an addressing scheme that enables each reconfiguration command to uniquely identify its intended target reconfigurable devices. Furthermore, each command preferably carries a network identification that enables the reconfiguration control network to limit the propagation scope of the command. Thus, all reconfiguration activities may be limited to a logically scoped subset of the system. This allows partial reconfiguration of a system where one portion of the system is reconfigured, while another portion is unaffected. Furthermore, the invention allows multiple simultaneous reconfigurations. The invention preferably uses tables (e.g. routing tables) to define the propagation scopes for each network identity.

This invention preferably implements the reconfigurable control network with a self-configurable transport architecture that can be reconfigured to address different situations and needs. The self-configurable transport architecture can be implemented in a variety of hardware topologies and configurations that are adapted to specific architectural needs. The self-configurable transport architecture can preferably be configured by loading internal tables, and preferably allows a plurality of logical networks to be programmed on top of the underlying physical topology. These logical networks can co-exist using distinct table entries within a single self-configurable transport architecture. Logical networks that do not share network hardware can be used in parallel, without interfering with each other. The self-configurable transport architecture preferably identifies a logical network using a network identifier. In addition to transporting reconfiguration commands from a controller to reconfigurable devices, the reconfiguration control network implemented by the self-configurable transport architecture can be used to reconfigure the network itself. For example, commands to update table entries in the network may be transported through the network. Thus, the self-configurable transport architecture can be reconfigured while it is in use. Reconfiguration commands propagate through logical networks and update selected configuration memories. The propagation scope and the resources needed to transmit these configuration commands can be limited using previously defined logical network topologies.

Thus, the invention preferably allows the scope of reconfiguration to be controlled such that particular networks of the plurality of logical networks can be reconfigured, in parallel and without interfering with the other networks. The invention preferably controls the scope of reconfiguration by controlling the reconfiguration command transmissions. The invention preferably uses the network transport wiring to send the reconfiguration commands. Furthermore, the invention preferably has a single underlying physical network of wires that can be used to support operational data transport, as well as, configuration.

FIG. 1 depicts a block diagram of an example of a self-reconfigurable system 100, according to an embodiment of the invention. The system includes a plurality of reconfigurable component clusters (RCCs) 101-1 to 101-N. Each RCC 101 is preferably attached to the reconfiguration control network 103 and reconfigured using a single shared programming port 104. Through the reconfiguration control network 103, reconfiguration commands can be routed to a specific RCC, a specific group of RCCs, or all RCCs. While the commands may originate from an external source 105, the commands may also originate from an RCC. Thus, one RCC could reconfigure another RCC, a group of RCCs, or all RCCs, including the originating RCC. Each RCC 101 may, in addition, be connected to the data plane wiring 102, which allows each RCC to send/receive data to/from the other RCCs.

Internally, each RCC is a collection of reconfigurable devices and has a mechanism for disseminating configuration information to these reconfigurable devices. For example, such a mechanism may be a scan chain, where the memory elements storing the configuration bits that define the logic implemented by the RCC are linked into a linear chain. During configuration, content is replaced by new values shifting in serially. Alternatively, the mechanism may be memory mapping, where the configuration bits memory elements within the RCC are organized into an addressable memory space, and written via a broadcast mechanism much like a memory system. Implementations of such a broadcast mechanism with bus(es), or switches are well known. In some realizations, the smallest entity that can be reconfigured is preferably a subset of an RCC. For example, each cluster 101 may comprise a collection of look-up tables (LUTs), configurable interconnects, functional units, such as adders, multipliers, etc., and memory elements. The smallest reconfigurable unit may be an entry of a LUT. There are a number of known techniques to enable such fine grain updates without perturbing other devices in an RCC. The memory-mapped mechanism supports fine grain updates. With a scan chain, the linear chain is linked into a loop, and shifted an appropriate number of times before update values are injected and further shifted. The RCC may also switch between an old and a new configuration instantaneously, e.g. a few clock cycles or even one clock cycle. Known techniques for performing this switch include storing extra configuration bits or backup bits that can be switched into the active configuration bits. RCC commands sent to an RCC through port 104 from the reconfiguration control network 103 can use any of these RCC-internal configuration techniques.

Note that a system, using the invention, at steady state may be viewed as comprising a number of logically-sized autonomous subsystems, each served by an active route in the reconfiguration control network. The active route in the autonomous subsystem preferably defines a tree, such that commands injected at the root of the tree are distributed throughout the subsystem. Furthermore, the active routes of different autonomous subsystems should not contend for the same network hardware, and can thus operate independently. This independence of reconfiguration control network operation enables these subsystems to operate autonomously. Note that several subsystems may actually choose to collaborate and interact through data plane wiring. An RCC preferably only belongs to one autonomous subsystem at any instance of time. Over time, an RCC's affiliation with autonomous subsystems can change, thus changing the way in which the system is partitioned. Note that it is possible that portions of the system are left as isolated network cells and isolated RCCs.

A reconfiguration may only change the configuration of RCCs within an existing autonomous subsystem, and not change the way in which the system is partitioned. In this case, RCC reconfiguration commands are sent through the reconfiguration control network, but the network itself is not reconfigured. Alternatively, a reconfiguration may involve both changes to the way the system is partitioned, and the way RCCs are configured. A reconfiguration may also change the network, and not change the configuration of the RCCs. One preferred realization involves changing the configuration of the reconfiguration control network itself. Note that even when the system is changing the way it is partitioned, autonomous subsystems that are unchanged can continue to operate independently. Consequently, multiple changes, forming separate autonomous subsystems, can occur simultaneously and independently. Changing the network configuration is achieved using network reconfiguration commands. In a preferred embodiment described later, these network reconfiguration commands include change active route command and route table update command. The term configuration command is used in this document to refer to all types of commands propagated through the reconfiguration control network, which may include RCC reconfiguration commands and network reconfiguration commands.

Figure 2:
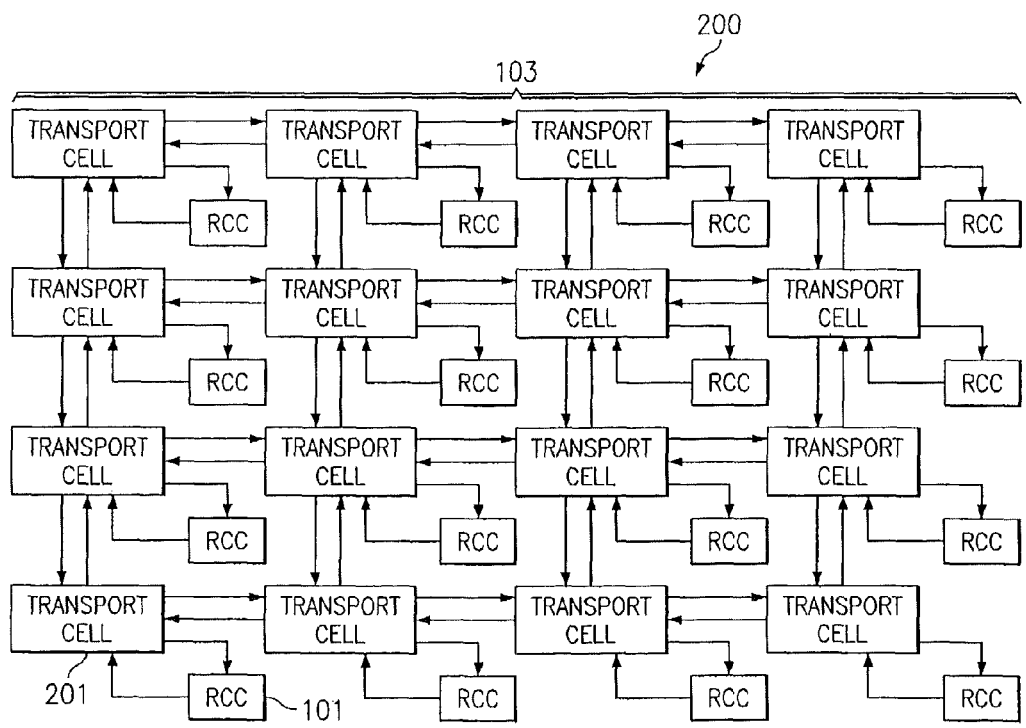
FIG. 2 depicts an example implementation of the reconfiguration control network of FIG. 1, according to an embodiment of the invention.

FIG. 2 depicts an example of an implementation of the reconfiguration control network 103 of FIG. 1, according to an embodiment of the invention. Note that for the sake of simplicity, the data plane wiring 102 is not shown.

The reconfiguration control network of the illustrated embodiment has three functions. First, the network maintains a set of logical network routes which are used to program logical interconnect requirements on an underlying physical interconnect. These network routes can be set up and changed using the reconfiguration control network itself. Second, each network cell allows a network route to be activated as the active network route at the cell. Third, the network supports the efficient transmission of a stream of messages using the active network route. This may, for example, be used to transmit reconfiguration commands to the RCCs. Depending on how the RCCs process messages received from the reconfiguration control network, the network may also be used for purposes other than reconfiguration.

The reconfiguration control network preferably comprises a plurality of transport cells 201. In one embodiment, each RCC 101 has an associated cell 201. Thus, a message sent from one RCC will be delivered to its associated cell, and then be delivered cell-to-cell, until it reaches the associated cell of the destination RCC. The associated cell then delivers the message to the destination RCC. In the arrangement shown in FIG. 2, one RCC sending a message to a neighbor RCC would traverse two cells, while a corner RCC sending a message to the opposite corner RCC would traverse seven cells. Note that additional cells may be used in a hierarchical arrangement to reduce the number of cells that must be used to carry a message from one RCC to another RCC. Further note that a pre-defined initialization topology may be stored in all cells to permit global access to all hardware resources. Such an initial topology may take the form of a tree that connects to every network cell and RCC in the system. The initial topology is used to gain initial control over all hardware. Note that a destination of a message or command may be a RCC, a cell, or any other addressable component of the system.

Figure 3:
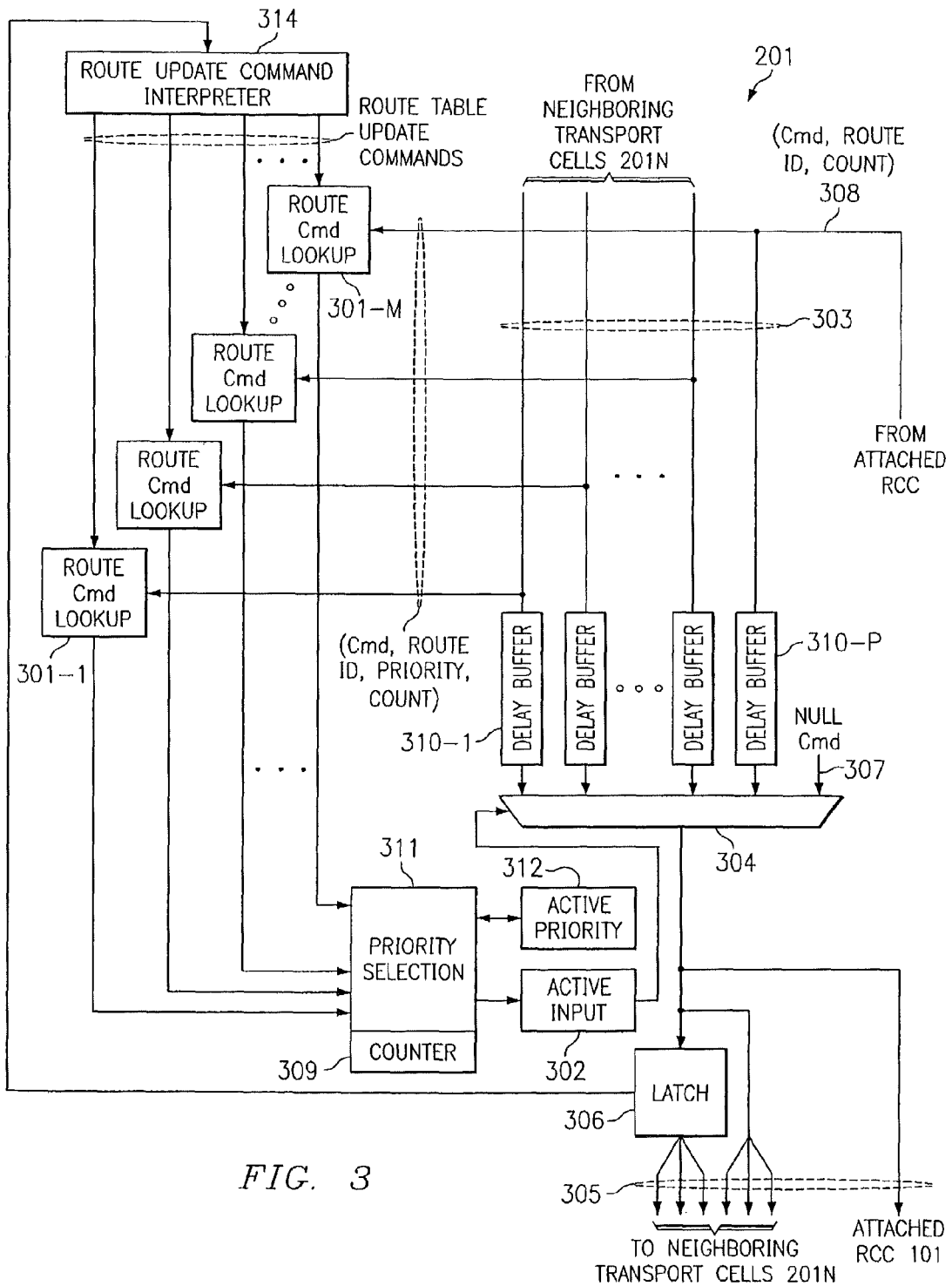
FIG. 3 depicts a block diagram of an implementation of a network cell of the reconfiguration control network of FIG. 2 that uses an input select, according to an embodiment of the invention.

FIG. 3 depicts a block diagram of an example implementation of a network cell 201 of the reconfiguration control network of FIG. 2, according to an embodiment of the invention. Each network cell 201 has a set of input ports 303 that connect to a set of N neighboring cells 201N, and in some cases, an associated RCC 101. Data from a particular port is transmitted through the cell to the output ports 305, when one of the inputs is selected by multiplexer 304. The output ports 305 are coupled to the N neighboring cells 201N and any associated RCC 101. The transmission through the cell may be non-pipelined and may bypass the data stream latch 306. Alternatively, the transmission may be pipelined and pass through the data stream latch 306, as determined by clock speed and timing issues. In either case, the data reaches the output ports 305 after a sufficient number of clock cycles. The delay buffers 310-1 to 310-P delay propagation of inputs into the multiplexer 304.

Each network cell 201 of the illustrated embodiment also includes an active input register 302 that holds a multiplexer input-select control value as specified by the cell's active route. This value controls the selection of the multiplexer 304, and consequently, determines the particular input 303 that is connected to the outputs 305. One multiplexer input-select value selects the null command input 307, and is used to isolate the cell from the neighboring cells. This ensures that no commands are propagated out of this cell to other cells. Another input 308 is the output stream from the associated RCC 101 that is coupled to this cell. This allows the RCC 101 to be a source for RCC reconfiguration commands that are transmitted through the network, to one or more destination RCCs that are to be reconfigured. It also allows the RCC 101 to be a source of network programming commands that are transmitted through the network to one or more destination network cells that are to be programmed. Finally, this also allows the RCC 101 to be a source for other messages that are sent to other RCCs on the network. Other inputs are the outputs from neighboring cells. The network cell 201 allows reconfiguration commands, network programming commands, as well as other messages, to propagate throughout the network according to the established active route.

To understand the operation of a cell, consider a stream of messages beginning at a source and reaching the input ports of neighboring cells. At each neighboring cell, the active input register determines which input port's message is propagated through the cell. When successfully propagated through a cell, the message arrives at the cell's neighbor cells, which in turn repeat the same propagation decision process. Messages therefore cascade from one cell to the next, with the propagation path determined by the active input register of each cell along the path. They reach a leaf cell of the propagation tree when none of the leaf cell's neighbors further propagate the message. Along the way, the message is delivered to the associated RCCs connected to cells that propagate the messages.

Propagation of messages through a network cell 201 is controlled by the value in its active input register 302. This active route may need to change because, for example, a single network route is insufficient to perform certain functions. To support more complex modes of operation, multiple network routes are stored in route tables within the Route Command Lookup circuit 301-1 to 301-M. Each Route Command Lookup circuit 301 preferably has its own route table 400 (shown in FIG. 4). Each table may have the same configurations as other tables, or may have different configurations from other tables, or some configurations that are the same and some that are different from other tables. The network cell supports route table update commands to program new network topologies into the route tables. It also supports change active route commands to load its active input register with new values corresponding to a valid network route stored in one of its route tables.

Figure 4:
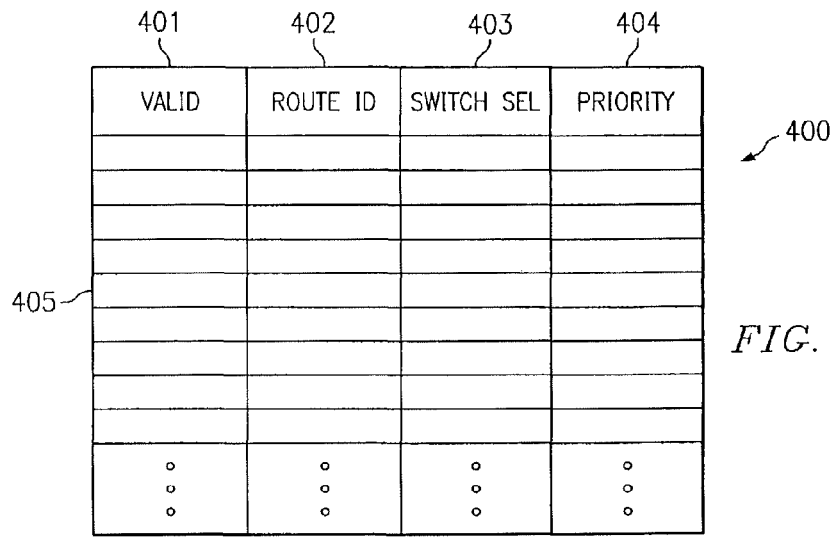
FIG. 4 depicts an arrangement of a route table stored in the route table memory of FIG. 3, according to an embodiment of the invention.

FIG. 4 depicts an example arrangement of a configuration table 400. Each entry 405 in each configuration table has a valid field 401 that indicates whether the entry is valid. The route ID field 402 is used to uniquely identify the route or logical network that the entry 405 defines. The switch select field 403 indicates the setting for the input multiplexer 304 for that topology. The priority field 404 indicates the priority associated with the entry 405 and is used during processing of a change active route command to determine the command's actual effects. The route table preferably contains a pre-defined boot-strap topology that connects to all the RCCs and network cells in the system and has the highest priority. Additional topologies are defined using route table update commands.

A route table update command is detected and processed by the route update command interpreter 314. Although a route table update command is propagated through the network according to the current active route, it is addressed to a specific network cell. The route update command interpreter of the other network cells in the propagation scope will not respond to it. A route table update command specifies the desired update, such as which entry in which table to modify and the new value to write into that entry. Note that in the preferred embodiment depicted in FIG. 3, a route table update command has to pass through the multiplexer 304 of a network cell, before the cell's route update command interpreter considers it. In an alternate embodiment, a network cell has a separate route update command interpreter for each input, and a route table update command is considered before it passes through a network cell's multiplexer. While this second embodiment requires more hardware than the first, it provides an additional capability. Specifically, it allows a route table update command to initiate a route table update at a network cell that is just beyond the boundary of the autonomous subsystem in which the update command is injected.

A change active route command requests that a network cells' active route be changed. It is first detected and processed by the Route Command Lookup circuits 301-1 to 301-M. Note that there is preferably one Route Command Lookup circuit 301 for each input from the neighboring cells and the associated RCC. Furthermore, each Route Command Lookup circuit looks for change active route commands in its respective input before the selection by the multiplexer 304. Therefore, a change active route command can arrive on an input and be processed, even if that input is not currently selected by the active input register's value for propagation through the cell. A change active route command is not addressed to a specific network cell, but is instead considered by every network cell that it reaches.

A change active route command comprises a CMD filed that identifies it as a change active route command as opposed to other types of messages carried over the reconfiguration control network. In addition, it carries a route ID field that uniquely identifies the route that is to be made active, and a count field that specifies the duration for which the route, if made active, should remain active. The count field can specify either a finite value or a special infinite value. The infinite value is used to indicate the situation where the new active route should remain active indefinitely.

When a change active route command is received on a given input, the command is processed to determine whether a change must be made to the active input register 312, active priority register 302, and/or counter register 309 of the current cell. This processing is partly controlled by data within the route table 400 associated with the input that the command arrives on. The command's route ID field is used to find a valid route table entry whose route ID matches. If no valid match is found, the command will have no effect on the network cell's active route. If a valid match is found, a priority scheme implemented by priority selection 311 is used to determine if a new active route should be established. The priority scheme operates in two steps. The first step addresses the situation when multiple change active route commands, each on a different input, arrive at the same network cell in the same cycle. This can result in multiple valid matches. The first step selects the highest priority route among the valid matches. This first step produces one candidate route. In the second step, this candidate route's priority is compared against the current active priority, as recorded in the Active Priority register 312. If the current active priority is higher than the candidate new route's priority, the active route is not changed. Otherwise, the network cell's active route is changed to that specified by the candidate new route. This involves loading three values: (i) the Active Input register 302 is loaded with the candidate new route's switch selection 403, as read from its route table entry; (ii) the Active Priority register 312 is loaded with the candidate new route's priority 404, as read from its route table entry; and (iii) the counter register 309 is loaded with the count value specified in the change active route command that resulted in the candidate new route. Effectively, an active configuration having a higher priority can block an attempt to change the active route to a route having lower priority. Note that while the above preferred embodiment associates a priority to each route in the route table, an alternate embodiment may specify priority in a change active route command, and thus allow each route in the route table to take on a different priority as requested by the change active route command.

Propagation of a change active route command through a network cell is controlled by the value in the Active Input register 302. The delay buffers 310-1 to 310-N ensures that if a change active route command results in an actual active route change at a network cell, the propagation of the change active route command through the cell is controlled by the new active route. The delay buffers 301-1 to 310-N provides sufficient delay to match the time needed to process the change active route command and have the new active route take effect. If there is no change to the network cell's active route, however, the decision of whether to propagate the command through the cell will continue to be made under the current, unchanged active route.

The above describes changing the active route of a network cell in response to the arrival of a change active route command. A network cell's active route can also change as a result of its counter register 309 counting down to zero. If the counter register 309 is loaded with a finite value when its network cell's active route is changed, the counter decrements every clock cycle. When this count reaches zero, the network cell's active route is changed to reflect a deactivated, isolated cell. The Active Input register 302 is loaded with a value that causes the multiplexer 304 to select the null command 307, and the Active priority 312 is set to the lowest value. Effectively, the active route is brought into being for the number of clock cycles specified by count, after which the network cell goes into the deactivated mode. If the counter register 309 is loaded with the unique value representing infinite count, the counter does not count down, and the network cell will not spontaneously go into the deactivated state. In that case, the active route persists until another change active route command arrives and successfully changes the active route.

At the system level, the invention has the ability to carve logically sized autonomous subsystems out of a reconfigurable system. Each subsystem can operate independently, either using a reconfiguration controller residing in the subsystem to reconfigure the RCCs within it, or executing the logic that has been configured into its RCCs. Furthermore, the way in which a system is partitioned can be modified, either by controllers within the system or by entities outside the system. This repartition also happens without interfering with the operation of the subsystems that are not changed during the repartition. The following provides example implementations of these system-level operations, using a reconfiguration control network with the aspects described above.

In one preferred embodiment of this invention, the reconfiguration control network has a pre-defined boot-strap route that is available upon power-up or reset. This route may be designed into the system and hard-coded into the route table, e.g. an entry in a route table of each network cell has a hard-coded entry. Note that different network cells in the system may contain different switch selection value 403 for the hard-coded entry, while sharing the same Route ID 402 and Priority 404 (preferably set to the highest value). Furthermore, each network cell, upon reset, is in the deactivated mode, where its multiplexer is selecting the null command, and its Active Priority is set to the lowest value. Upon reset or power-up, a change active route command that selects the predefined boot-strap route's Route ID is then injected from the root of the boot-strap route's tree to make it the active route of all network cells in the system. In one preferred embodiment, this command injection is performed by a hard-wired circuit within the system that is connected to the root of the boot-strap route's tree. Note that only one change active configuration command is needed, because at the first network cell, it causes the boot-strap route to become the cell's active route before the command itself is propagated through the cell based on the active route. Specifically, at the first network cell, a route command lookup circuit processes this change active configuration command, finds the hard-coded entry in its table and makes that its active route. The command is then propagated to all neighbors of this first network cell.

When the change active route command arrives at a neighboring cell, one of two events may occur. If the input that the command arrives on is a link of the boot-strap route tree, the route command lookup circuit will find the relevant hard-coded entry in the route table, and subsequently make that the active route for the network cell. The command is then propagated to this cell's neighbors. Alternatively, if the input that the command arrives on is not a link of the boot-strap route tree, the route command lookup circuit will not find a match, and the network cell's active route is not changed. Also, the change active configuration command is not propagated further.

This propagation behavior for a change active route command preferably repeats at each network cell that is part of the new route. This also applies to routes other than the pre-defined boot-strap route. In those cases, when a new route covers only a subset of the system, this propagation ends when it reaches the network cell that is just beyond the network cells supporting the new route. Note that careful assignments of route ID must be made, so that a route ID will never have a matching entry in cells beyond the boundary of a new route. Thus, change active route commands will be ignored or dropped at cells beyond the intended boundary due to lack of a match.

In some usage, the active route is established with infinite count. Once an active route has been established covering an entire autonomous subsystem, configuration of the RCCs in the autonomous subsystem, and the programming of route tables in network cells within the subsystem can proceed. Appropriate commands to either reconfigure an RCC or to program a route table are injected at the root of the subsystem's active route, and propagated through all the subsystem's network cells to all its RCCs. Each network cell and RCC examines each command and responds as necessary. In the boot-strap case, the system first establishes an autonomous subsystem that covers the entire system and then proceeds with RCC configuration commands and/or network cell programming command. Some embodiments will read the RCC configuration and network cell programming. Some embodiments will read the RCC configuration commands and/or network cell programming commands from a memory (e.g., ROM or RAM) associated with the system.

Once the route corresponding to an autonomous subsystem has been programmed into its network cell's route tables, bringing that subsystem into being involves injecting a change active route command from the new route's root. In one preferred embodiment, the change from one way of partitioning a subset of a chip to another different way of partitioning the same subset of the chip is achieved by first deactivating all the autonomous subsystems within the subset of the chip involved, before activating the new autonomous subsystems. If an autonomous subsystem's active route had been established with an infinite count, deactivating the autonomous subsystem involves sending another change active route command to activate the same (old) route, but with a finite count that is just sufficient for the change active route command itself to propagate through each network cell. Thus, as this command propagates through its autonomous subsystem's active route tree, the route is deactivated behind it. Note that arrival of this command along inputs that are not part of the active route tree or at a neighboring network cells just beyond the boundary has no effect on the network cell, because the route table lookup fails to find a match.

The ability to specify an arbitrary, fixed length of time before the actual deactivation of an active route has further uses. For example, a higher count than needed for the passage of the change active route command may be specified, so that additional messages may be sent from the controller of an out-going autonomous subsystem to the controllers of the new autonomous subsystems that will be formed. As an example, consider the task of splitting a single autonomous subsystem A into three smaller ones, namely autonomous subsystems B, C, and D. While autonomous subsystem A exists, preparation is made for the fission. Network cell route tables are programmed to have entries for B, C, and D's routes using autonomous subsystem A's active route to propagate the programming commands. Some RCCs may be configured to become the controllers for the yet to be activated new autonomous subsystems. Finally, a command to deactivate autonomous subsystem A is issued, but with sufficient extra time before its actual deactivation so that another message can be sent from autonomous subsystem A's controller to the new autonomous subsystems B, C, and D's controllers, instructing them to start activating their respective autonomous subsystems. The controllers of autonomous subsystems B, C, and D will wait a sufficient statically known amount of time for the reconfiguration control network to go into the deactivated state. Each then activates its active route by injecting an appropriate change active route command.

Another example is when several autonomous subsystems are to be fused into one larger autonomous subsystem. Each autonomous subsystem should deactivate itself. When that is all done, the controller for the new larger autonomous subsystem can activate its route by injecting an appropriate change active route command. Part of this process assumes knowing that each original autonomous subsystem has deactivated. There are many ways to achieve this coordination. The simplest is when the coordination can be done statically. For instance, the execution time in each of the original autonomous subsystem is known. Alternatively, the coordination may be done dynamically, using the data plane interconnect to provide communication between the original autonomous subsystems' controllers and the new autonomous subsystem's controller. While many designs for such a data plane interconnect are possible, one possible design is to use network cells similar to those in the reconfiguration control network. Another way is to use reconfigurable interconnect similar to those in field programmable gate arrays (FPGAs) that are programmed as parts of the RCCs. The deactivation of each original autonomous subsystem's active route may be spontaneous upon completion of its execution. In other situations it may be necessary to forcibly cause an autonomous subsystem to be deactivated, a capability enabled by the network cell's priority feature.

One use of the priority feature is to forcibly reclaim possession of a subset of the system. For example, consider general-purpose computer systems with multiple user-level jobs and a system-level operating system. If user-level jobs only use priorities other than the highest one, a system-level job can use the highest level priority and establish its own desired routes, even those that would compete with the user-level jobs. The system-level job will win over competing lower priority user level attempts to change the active route. Once in place, the system-level job's highest priority active route cannot be displaced by lower priority user-level attempts to change the active route. Note that the priority feature of the invention is optional and is not necessary for operation of the invention. Some systems may not need this feature and will still enjoy the benefits of logically partitioning the system into non-interfering independently reconfigurable parts.

One skilled in the art will understand that there are many other variations of the network cell design that confers the benefits of this invention. One aspect of a network cell according to this invention is the ability to selectively propagate messages from its input to its outputs. The preferred embodiment described above presents a network cell that utilizes input selection with the multiplexer 304 to control selective propagation of messages through the cell. One alternative network cell embodiment utilizes output selection to achieve this benefit.

Figure 5:
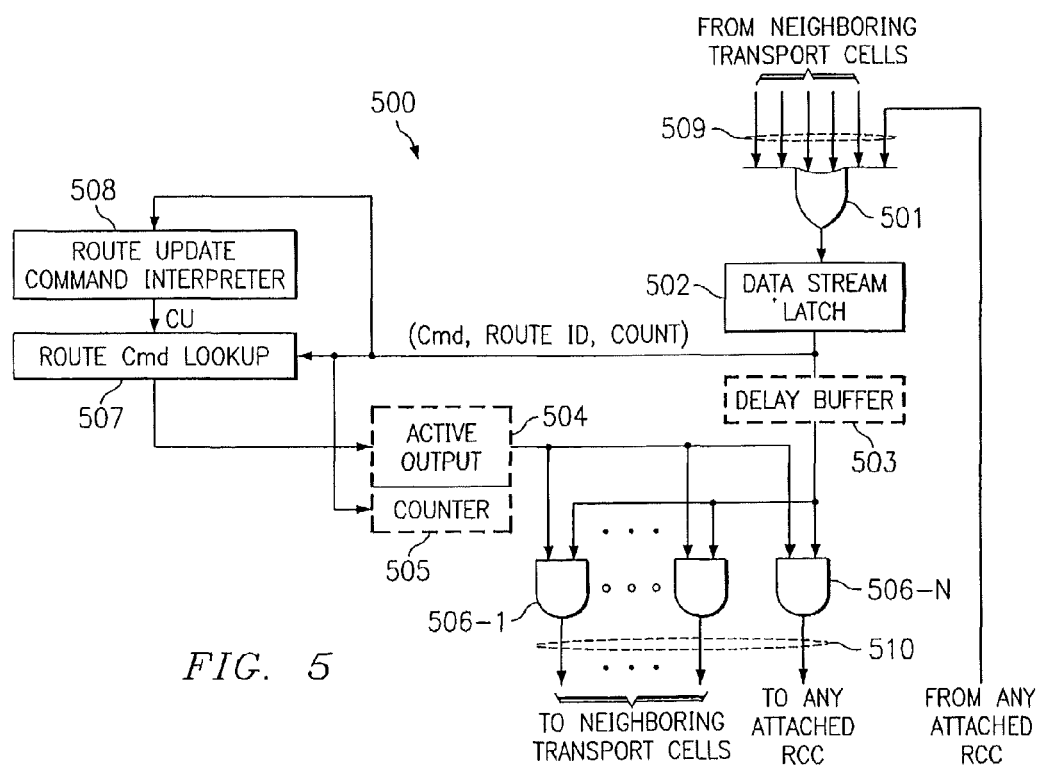
FIG. 5 depicts a block diagram of another implementation of a network cell of the reconfiguration control network of FIG. 2 that uses an output select, according to an embodiment of the invention.

FIG. 5 is an example implementation of a network cell based on the output-select approach. Correct operation of a system utilizing an output-select network cell requires that certain rules are followed. In particular, a system's network of cells are configured and used in such a way that among the inputs 509 of a network cell, at most only one injects a valid message on a given cycle. The other inputs provide null message. The OR gate 501 in FIG. 5 represents merging these inputs, with the result being at most one valid message passing through. If null messages are represented with zeros, OR gates will be the appropriate merging logic. The cell 500 propagates any input message to a selected set of outputs 510, based on the value stored in its Active Output register 504. This value can be viewed as a vector of bits, one corresponding to each output. Preferably, a value of one indicates that the corresponding output should get a copy of the input message while a value of zero indicates that the corresponding output should not get a copy of the input message. Thus, outputs not receiving the message are presented with the null message. One way of implementing this is to use AND gates 506-1 to 506-N. Similarly to the arrangement of FIG. 3, the output-select network cell of FIG. 5 supports change active route command, the active route lifetime counts, and update route table command. To support these capabilities, FIG. 5 contains a Route Cmd Lookup circuitry 507, a Route Update Command interpreter 508, a delay Buffer 503, a Counter register 505, and latch 502, that have the same functions as correspondingly named components in the input-select network cell of FIG. 3. Note that this example has only one set of route command lookup circuitry 507 and route command interpreter 508 in the output-select cell, which is shared among all its inputs, as compared to one set for each input in an input-select cell of FIG. 3.

One skilled in the art will also realize that a network cell design may incorporate both the input-select and output-select capabilities into a hybrid design. The hybrid design can be thought of as augmenting the network cell of FIG. 3 with the output selection components, e.g. an active output register and corresponding gating AND gates of FIG. 5, and including a merging OR gate before each input to each delay buffer. Each merging OR gate merges several inputs that should not be simultaneously carrying messages. In some situations, a hybrid design may be more efficient in terms of lower hardware requirement and/or greater flexibility in the way the system may be partitioned.

Another network cell design may support multiple simultaneous transmissions, e.g. multiple simultaneous active routes through a network cell, particularly as long as they involve non-overlapping inputs, outputs, and cell-internal hardware. One embodiment of such a cell may implement the selective forwarding by use of a cross-bar controlled by an Active Route register. A cross-bar connecting n inputs to m outputs has n*m switches and requires an n*m bit value in the Active Route register to control which inputs are connected to which outputs. For correct operation, each output should only be driven with a valid message by at most one input. In cases of conflicting requests, some embodiments may choose to use the priority associated with the competing request to determine the winner. As before change active route command, the active route lifetime counts, and update route table command would be supported.

Note that configuration command includes change active configuration command, update route table command, and RCC reconfiguration commands.

What is claimed is:
1. A reconfigurable computer system comprising:
 a plurality of reconfigurable component clusters (RCCs), each of which can change their respective configuration upon receiving a configuration command; and
 a reconfiguration network for distributing the configuration command to the RCCs, where the reconfiguration network comprises a plurality of cells, wherein each RCC is connected to a cell;
 wherein a cell selects the configuration command from a particular input of at least two inputs to the cell, for processing by the cell and distribution to the reconfiguration network.
2. The system of claim 1, wherein:
 the plurality of cells are arranged such that a configuration command from any one RCC may be sent to any RCC of the plurality of RCCs through the plurality of cells.
3. The system of claim 1, wherein:
 the configuration command affects the distribution of the command.
4. The system of claim 1, wherein:
 the reconfiguration network manages a scope of distribution for the configuration command;
 wherein RCCs within the scope respond to the configuration command, and RCCs that are outside of the scope operate independently from the configuration command.
5. The system of claim 4, wherein:
 the network controls propagation of the configuration command such that RCCs outside of the scope do not receive the configuration command.

6. The system of claim 4, wherein:
the network distributes the configuration command to a portion of the cells; and RCCs that are outside of the scope disregard the configuration command.

7. The system of claim 4, wherein:
the network distributes the configuration command to each respective cell of the plurality of RCCs; and
RCCs that are outside of the scope disregard the configuration command.

8. The system of claim 7, wherein:
each cell compares an identifier of the configuration command to determine whether to send the command to its RCC.

9. The system of claim 1, wherein:
an originating RCC initiated the configuration command;
whereby the originating RCC controls the configuration of at least one other RCC.

10. The system of claim 1, wherein:
the cell selectively forwards the configuration command to at least one of another cell and its RCC based on an active route of the cell.

11. The system of claim 10, wherein:
the active route is a portion of a tree.

12. The system of claim 10, wherein:
the cell selects at least one destination of at least two destinations in the reconfiguration network to receive the configuration command.

13. The system of claim 10, wherein:
the active route is one of a plurality of routes.

14. The system of claim 10, wherein:
the cell can change the active route to another route.

15. The system of claim 14, wherein the configuration command comprises:
a change active route command;
wherein the changing of the active route is invoked upon receiving the change active route command.

16. The system of claim 15, wherein the cell further comprises:
at least one buffer that holds the change active route command such that active route of the cell can be switched to the route associated with the change active route command before distribution of the change active route command occurs.

17. The system of claim 15, wherein:
the change active route command specifies a time period for the active route to be active.

18. The system of claim 15, wherein the cell comprises:
a route table that maintains a plurality of routes for the cell;
whereby the change active route command causes the cell to switch the active route to one of the plurality of routes in the route table.

19. The system of claim 18, wherein the active route has a priority, and wherein the change active command route is operative when the priority of the route associated with the change active command route is greater than or equal to the priority of the active route.

20. The system of claim 19, wherein the priority of the route associated with the change active route command is specified in the route table.

21. The system of claim 18, wherein:
the cell can change the route table.

22. The system of claim 21, wherein the configuration command comprises:
an update route table command;
wherein the changing of the route table is invoked upon receiving the update table command.

23. The system of claim 10, wherein:
the active route is active for a predetermined time period.

24. The system of claim 23, wherein:
after expiration of the predetermined time period, the cell enters a deactivated state and distributes a null command to the network.

25. The system of claim 10, wherein:
the active route is active for an indefinite time period.

26. The system of claim 15, wherein the active route has a priority, and wherein the change active command route is operative when the priority of the route associated with the change active command route is greater than or equal to the priority of the active route.

27. The system of claim 26, wherein the priority of the route associated with the change active route command is specified in the change active route command.

28. The system of claim 1, wherein:
at least one RCC is connected to more than one cell.

29. The system of claim 1, wherein:
a source of the configuration command is an RCC.

30. The system of claim 1, wherein:
a source of the configuration command is other than an RCC.

31. A reconfigurable computer system comprising:
a plurality of reconfigurable component clusters (RCCs), each of which can change their respective configuration upon receiving a configuration command; and
a reconfiguration network for distributing the configuration command to the RCCs, wherein the reconfiguration network comprises a plurality of cells, wherein each RCC is connected to a cell;
wherein a cell receives a configuration command from an input to the cell for processing by the cell, and the cell selects at least one destination of at least two destinations in the reconfiguration network to receive the configuration command.

32. The system of claim 31, wherein:
the plurality of cells are arranged such that a configuration command from any one RCC may be sent to any RCC of the plurality of RCCs through the plurality of cells.

33. The system of claim 31, wherein:
the cell selectively forwards the configuration command to at least one of another cell and its RCC based on active route of the cell.

34. The system of claim 33, wherein:
the cell selects the configuration command from a particular input to the cell, for processing by the cell and distribution to the reconfiguration network.

35. A reconfigurable computer system comprising:
a plurality of reconfigurable component clusters (RCCs), each of which can change their respective configuration upon receiving a configuration command; and
a reconfiguration network for distributing the configuration command to the RCCs, wherein the reconfiguration network comprises a plurality of cells, wherein each RCC is connected to a cell;
wherein a cell receives a plurality of configuration commands from a plurality of inputs to the cell for processing by the cell and distribution to the reconfiguration network; and
wherein the cell selects at least one destination of a plurality of destinations in the reconfiguration network to receive each configuration command.

36. A method for reconfiguring a computer system comprising:

providing a plurality of reconfigurable component clusters (RCCs), each of which can change their respective configuration upon receiving a configuration command;

providing a plurality of cells for distributing the configuration command to the RCCs; and selecting, by a cell, the configuration command from a particular input to the cell, for processing by the cell and distribution to the plurality of cells.

37. A method for reconfiguring a computer system comprising:

providing a plurality of reconfigurable component clusters (RCCs), each of which can change their respective configuration upon receiving a configuration command;

providing a plurality of cells for distributing the configuration command to the RCCs;

receiving, by a cell, the configuration command from an input to the cell for processing by the cell; and selecting, by the cell, at least one cell of the plurality of cells to receive the configuration command.

38. A configurable system, comprising:

a set of components each having a configuration that is controlled by a component configuration command;

a control network that carries the component configuration command to the components via a route through the control network that is controlled by a set of network configuration commands, wherein the control network includes a transport cell for each component such that the network configuration commands determine a routing path through each transport cell.

* * * * *